US012574351B2

(12) United States Patent
Tambakuwala et al.

(10) Patent No.: US 12,574,351 B2
(45) Date of Patent: Mar. 10, 2026

(54) AUTOMATING CONTROLLER IP ADDRESS CHANGE IN CLIENT-BASED AGENT ENVIRONMENTS

(71) Applicant: Juniper Networks, Inc., Sunnyvale, CA (US)

(72) Inventors: Himanshu Kumar Tambakuwala, Bangalore (IN); Naeem Ilyas Maniar, Bengaluru (IN); Sachin Dattatreya Joshi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/339,709

(22) Filed: Jun. 22, 2023

(65) Prior Publication Data

US 2024/0430228 A1 Dec. 26, 2024

(51) Int. Cl.
*H04L 61/5076* (2022.01)
*H04L 43/0811* (2022.01)
*H04L 61/5007* (2022.01)

(52) U.S. Cl.
CPC ...... *H04L 61/5076* (2022.05); *H04L 43/0811* (2013.01); *H04L 61/5007* (2022.05)

(58) Field of Classification Search
None
See application file for complete search history.

(56) References Cited

U.S. PATENT DOCUMENTS 7,561,581 B2 * 7/2009 Kim .................... H04L 61/5092
370/395.54
8,104,081 B2 * 1/2012 Khanna ............... H04L 67/1001
709/217

(Continued)

FOREIGN PATENT DOCUMENTS

CN 112866413 A * 5/2021 ............. H04L 67/61
CN 115484204 B * 1/2025 ......... H04L 41/0663

(Continued)

OTHER PUBLICATIONS

"Change the IP Address that clients use to communicate with the Endpoint Protection Manager," https://knowledge.broadcom.com/external/article/178178/change-the-ip, Last Updated Jul. 25, 2022, 2 pp.

(Continued)

*Primary Examiner* — Younes Naji
(74) *Attorney, Agent, or Firm* — Shumaker & Sieffert, P.A.

(57) ABSTRACT

A system includes a computer-readable storage media and one or more processors. The one or more processors are configured to send data to a controller using a first Internet Protocol (IP) address stored by the computer-readable storage media as an IP address associated with the controller. The one or more processors are further configured to, in response to receiving a request to change the IP address associated with the controller from the first IP address to a second IP address, determine whether the controller is (Continued)

accessible using the first IP address and, based on whether the controller is accessible using the first IP address, change the IP address associated with the controller and stored by the computer-readable storage media to the second IP address. The one or more processors are further configured to send data to the controller using the second IP address stored by the computer-readable storage media.

20 Claims, 8 Drawing Sheets

(56) References Cited

U.S. PATENT DOCUMENTS

| | | | | |
|---|---|---|---|---|
| 8,838,771 | B2 * | 9/2014 | Pote .................... | H04L 65/1104 |
| | | | | 709/224 |
| 10,200,248 | B1 | 2/2019 | Jiang et al. | |
| 10,516,761 | B1 | 12/2019 | A et al. | |
| 11,153,173 | B1 * | 10/2021 | Rebeja ................ | H04L 61/2503 |
| 12,003,480 | B1 * | 6/2024 | Arunachalam ..... | H04L 61/5007 |
| 2010/0070623 | A1 | 3/2010 | Sawada | |
| 2014/0250213 | A1 * | 9/2014 | Seki .................... | H04L 41/0803 |
| | | | | 709/220 |
| 2018/0083918 | A1 * | 3/2018 | Matsumoto ......... | H04L 61/2528 |
| 2020/0092211 | A1 * | 3/2020 | Vytla ................... | H04L 47/2483 |
| 2023/0342260 | A1 * | 10/2023 | Mehta .................. | G06F 16/183 |

FOREIGN PATENT DOCUMENTS

| | | | | | |
|---|---|---|---|---|---|
| EP | | 0967769 | A2 | 12/1999 | |
| KR | | 2009013865 | A * | 2/2009 | |
| WO | WO-2008043648 | A1 * | 4/2008 | ............. | H04L 69/40 |
| WO | WO-2018099308 | A1 * | 6/2018 | ......... | H04L 61/5053 |

OTHER PUBLICATIONS

"Considerations for Changing a Server IP Address," retrieved from https://help.hcltechsw.com/domino/10.0.1/admin/plan_considerationsbeforechangingaserversipaddress_c.html, on Mar. 17, 2023, 2 pp.

"Migrate Database," Juniper Networks, Mar. 25, 2023, 4 pp.

"Restoring Client-Server Communications with Communication Update Package Deployment," https://techdocs.broadcom.com, Nov. 11, 2022, 2 pp.

"VMware vCenter Server IP Address Change Causes VMware ESX Hosts to Disconnect (1001493)," https://kb.vmware.com/s/article/1001493, Nov. 28, 2022, 6 pp.

Bjorklund, "YANG—A Data Modeling Language for the Network Configuration Protocol (NETCONF)," Internet Engineering Task Force, RFC 6020, Oct. 2010, 173 pp.

Enns, "NETCONF Configuration Protocol," Network Working Group, RFC 4741, Dec. 2006, 96 pp.

Harrington et al., "An Architecture for Describing Simple Network Management Protocol (SNMP) Management Frameworks," Network Working Group, RFC 3411, Dec. 2002, 65 pp.

Extended Search Report from counterpart European Application No. 23192225.3 dated Jan. 16, 2024, 8 pp.

Johnson et al., "Mobility Support in IPV6," Network Working Group, RFC 3775, Jun. 2004, 166 pp.

Notice of Intent to Grant and Text Intended to Grant from counterpart European Application No. 23192225.3 dated Oct. 7, 2025, 39 pp.

Response to Extended Search Report dated Jan. 16, 2025, from counterpart European Application No. 23192225.3, filed Jun. 23, 2025.

* cited by examiner

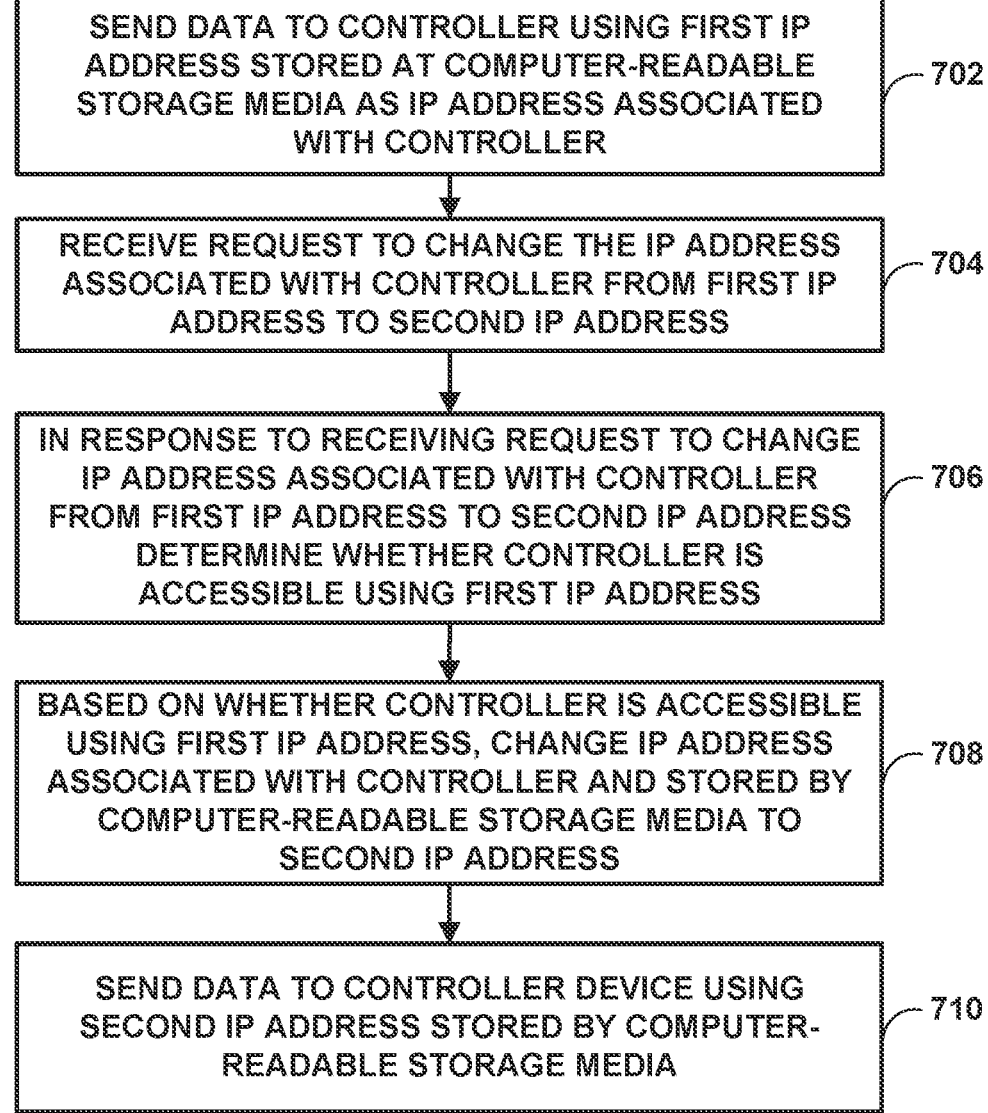

SEND DATA TO CONTROLLER USING FIRST IP ADDRESS STORED AT COMPUTER-READABLE STORAGE MEDIA AS IP ADDRESS ASSOCIATED WITH CONTROLLER — 702

RECEIVE REQUEST TO CHANGE THE IP ADDRESS ASSOCIATED WITH CONTROLLER FROM FIRST IP ADDRESS TO SECOND IP ADDRESS — 704

IN RESPONSE TO RECEIVING REQUEST TO CHANGE IP ADDRESS ASSOCIATED WITH CONTROLLER FROM FIRST IP ADDRESS TO SECOND IP ADDRESS DETERMINE WHETHER CONTROLLER IS ACCESSIBLE USING FIRST IP ADDRESS — 706

BASED ON WHETHER CONTROLLER IS ACCESSIBLE USING FIRST IP ADDRESS, CHANGE IP ADDRESS ASSOCIATED WITH CONTROLLER AND STORED BY COMPUTER-READABLE STORAGE MEDIA TO SECOND IP ADDRESS — 708

SEND DATA TO CONTROLLER DEVICE USING SECOND IP ADDRESS STORED BY COMPUTER-READABLE STORAGE MEDIA — 710

FIG. 7

AUTOMATING CONTROLLER IP ADDRESS CHANGE IN CLIENT-BASED AGENT ENVIRONMENTS

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controllers, may support these services such that an administrator (e.g., a network administrator) can easily create and manage these high-level network configuration services.

SUMMARY

In general, this disclosure describes techniques for communicating a change to an Internet Protocol (IP) address of a network management system (NMS), also referred herein as a controller. For example, a controller (e.g., executed by a virtual execution element(s)) for managing network devices may be moved to a different virtual execution element in a different network and having a different IP address used to communicate with the managed network devices. In other examples, the same controller may not be moving but may communicate with the network devices using a different, updated IP address. An agent of the controller, such as an client-based agent of the controller executing on a managed network device (sometimes referred to as an "on-box agent"), can be configured to receive and process an indication of a change in the IP address for sending data to the controller.

For instance, the NMS may need to migrate from executing on a virtual machine in one tenant network to a virtual machine in another tenant network associated with a different IP subnet. Rather than relying on manually changing the IP address associated with the NMS in each network device, the NMS may be configured to automatically send an IP address change request to the network devices. The virtual machine implementing the controller at the original IP address may simply be removed after the request for IP change is sent, or the virtual machine at the original IP address may remain online and confirm the IP address change with the network devices. Migrating from automatically sending an IP change request may be potentially more efficient and/or with result in fewer errors than systems that rely on manually updating an IP address for the controller that is stored at each network device. Moreover, an IP address that a network device in a "client" role uses to communicate with the controller in a "server" role may be updated when the controller moves to a new virtual machine or a new controller is provisioned (e.g., a change in version, type, vender, etc.), in a manner that is potentially more efficient and/or with fewer errors than systems that rely on manually updating an IP address for the controller that is stored at each network device.

In one example, a system comprises computer-readable storage media and one or more processors operable to send data to a controller using a first IP address stored by the computer-readable storage media as an IP address associated with the controller and, in response to receiving a request to change the IP address associated with the controller from the first IP address to a second IP address, determine whether the controller is accessible using the first IP address. Based on whether the controller is accessible using the first IP address, the one or more processors are further operable to change the IP address associated with the controller and stored by the computer-readable storage media to the second IP address and send data to the controller using the second IP address stored by the computer-readable storage media.

In another example, a method includes sending, by one or more processors, data to a controller using a first IP address stored by computer-readable storage media as an IP address associated with the controller and, in response to receiving a request to change the IP address associated with the controller from the first IP address to a second IP address, determining, by the one or more processors, whether the controller is accessible using the first IP address. The method further includes, based on whether the controller is accessible using the first IP address, changing, by the one or more processors, the IP address associated with the controller and stored by the computer-readable storage media to the second IP address and sending, by the one or more processors, data to the controller using the second IP address stored by the computer-readable storage media.

In one example, computer-readable storage media encoded with instructions for causing one or more programmable processors to send data to a controller using a first IP address stored by the computer-readable storage media as an IP address associated with the controller. The instructions further cause the one or more programmable processors to, in response to receiving a request to change the IP address associated with the controller from the first IP address to a second IP address, determine whether the controller is accessible using the first IP address and based on whether the controller is accessible using the first IP address, change the IP address associated with the controller and stored by the computer-readable storage media to the second IP address. The instructions further cause the one or more programmable processors to send data to the controller using the second IP address stored by the computer-readable storage media.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a flowchart illustrating an example process for processing an IP address change request, in accordance with the techniques described in this disclosure.

DETAILED DESCRIPTION

Figure 1:
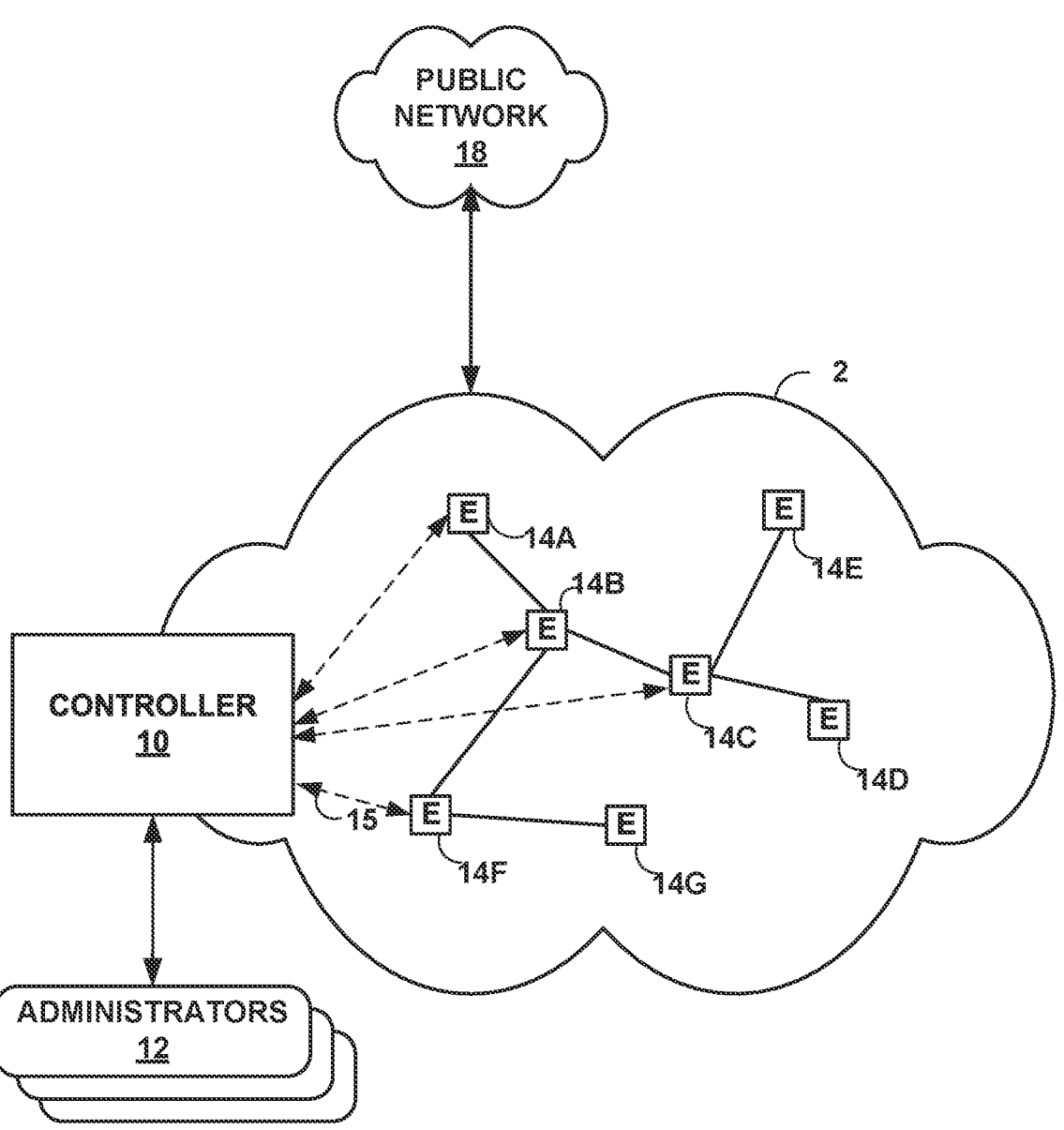
FIG. 1 is a block diagram illustrating an example including elements of an enterprise network that are managed using a controller, in accordance with the techniques of the disclosure.

FIG. 1 is a block diagram illustrating an example including elements of an enterprise network 2 that are managed using a controller 10. Managed elements 14A-14G (collectively, "elements 14") of enterprise network 2 include network devices interconnected via communication links to form a communication topology in order to exchange resources and information. Elements 14 (also generally referred to as network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller 10 is communicatively coupled to elements 14 via enterprise network 2. Controller 10 may include, for example, virtual execution elements (e.g., virtual machines or containers) deployed to virtualized computing infrastructure within a network. In some examples, controller 10 may be implemented as software executed by a virtual machine or a cluster of virtual machines. Controller 10, in some examples, forms part of a device management system, although only one device of the device management system is illustrated for purpose of example in FIG. 1. Controller 10 may be coupled either directly or indirectly to the various elements 14. Once elements 14 are deployed and activated, administrator 12 uses controller 10 to manage elements 14 using a device management protocol. One example device protocol is the Simple Network Management Protocol (SNMP) that allows controller 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller 10, also referred to herein as a network management system (NMS), controller device, or NMS device, and elements 14 may be centrally maintained by an IT group of the enterprise. Administrator 12 interacts with controller 10 to remotely monitor and configure elements 14. For example, administrator 12 may receive alerts from controller 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller 10 or a local workstation to interact directly with elements 14, e.g., through telnet, secure shell (SSH), or other such communication sessions. That is, elements 14 provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller 10, to directly configure element 14F. In this manner, a user can provide commands in a format for execution directly to elements 14.

Further, administrator 12 can also create scripts that can be submitted by controller 10 to any or all of elements 14. For example, in addition to a CLI interface, elements 14 also provide interfaces for receiving scripts that specify the commands in accordance with a scripting language. In a sense, the scripts may be output by controller 10 to automatically invoke corresponding remote procedure calls (RPCs) on the managed elements 14. The scripts may conform to, e.g., extensible markup language (XML) or another data description language.

Administrator 12 uses controller 10 to configure elements 14 to specify certain operational characteristics that further the objectives of administrator 12. For example, administrator 12 may specify for an element 14 a particular operational policy regarding security, device accessibility, traffic engineering, quality of service (QOS), network address translation (NAT), packet filtering, packet forwarding, rate limiting, or other policies. Controller 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741 December 2006, available at tools.ietf.org/html/rfc4741, the entire contents of which are incorporated herein by reference. Controller 10 may establish NETCONF sessions with one or more of elements 14.

A user configuration of devices may be referred to as "intents." An intent-based networking system may help to allow administrators to describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controllers may model intent data models as unified graphs, so that the intend models can be represented as connected. In this manner, business policies can be implemented across intent data models. When intents are modeled using a unified graph model, extending new intent support needs to extend the graph model and compilation logic.

Controller 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020 October 2010, available at tools.ietf.org/html/rfc6020).

In order to configure devices to perform the intents, administrator 12 may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller 10 may also be configured to output respective sets of low-level device configuration data, e.g., device configuration additions, modifications, and removals. Additional details regarding an example process for translating high-level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller 10 may use YANG modeling for an intent data model and low-level device configuration models. This data may contain relations across YANG entities, such as list items and containers. In some examples, controller 10 may convert a YANG data model into a database model, and convert YANG validations into data validations. Techniques for managing network devices using a graph model for high-level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller 10 may receive data from administrators 12 representing any or all of create, update, and/or delete actions with respect to the intent data model. Controller 10 may be configured to use the same compilation logic for each of create, update, and delete as applied to the graph model.

In general, controller 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller 10 may receive an indication of a topology and a role for element 14A and generate device-level configuration information for element 14A. For example, administrator 12 may select a topology and role for element 14A and provide an intent. In some examples, controller 10 may generate device-level configuration for element 14A based on the role (e.g., spine or leaf) of element 14A in the topology (e.g., a spine and leaf topology), the topology, and the intent.

For example, controller 10 may receive an intent from administrator 12. In this example, controller 10 may determine an intent model (e.g., an intent graph model) using the intent from administrator 12. The intent received from administrator 12 may include, for example, a set of requirements that includes a specification of an intent that identifies a desired service and an associated reference design to be used to implement the intent. The reference design may identify a standard manner in which component systems and devices are to be organized to provide a service. For example, the reference design may identify a network topology and protocol(s) to be utilized to provide an intended network service. The intent may specify one or more requirements (e.g., declarative network requirements) of the desired service independent of the reference design to be utilized. For example, the intent may specify that 20 elements of elements 14 are to be networked together.

By separating the specification of the intent and the reference design, different reference design implementations of the intent may be achieved by simply specifying different reference designs along with the same intent. The set of requirements may include a set of declarative requirements. For example, declarative requirements may express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, administrator 12 may be relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of network 2 may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

For example, controller 10 may cause elements 14 to implement the network service using the graph model. For example, controller 10 may generate high-level instructions for elements 14. In some instances, controller 10 may output the high-level instructions to each element of elements 14. Additionally, or alternatively, elements 14, or more specifically, for example, an agent executing at each one of elements 14 may determine respective low-level instructions for one or more elements of elements 14 from the high-level instructions.

In accordance with the techniques of the disclosure, element 14A may send data to controller 10 using a first Internet Protocol (IP) address. In response to receiving a request to change the IP address associated with controller 10 from the first IP address to a second IP address, element 14A may determine whether controller 10 is accessible using the first IP address. Based on whether the controller 10 is accessible using the first IP address, element 14A may change the first IP address stored at a computer-readable storage media of element 14A to the second IP address.

For example, element 14A may change the first IP address stored at a computer-readable storage media of element 14A to the second IP address when the controller 10 is not accessible using the first IP address. In some examples, element 14A may change the first IP address stored at the computer-readable storage media to the second IP address when the controller 10 is accessible using the first IP address and when element 14A receives a confirmation of the change in IP address from controller 10. After the change in IP address, element 14A may send data to controller 10 using the second IP address stored at the computer-readable storage media. In this way, the NMS may automatically send IP address change request to elements 14, which may reduce an amount of time to configure elements of 14 to send data to controller 10 using a new IP address and/or with fewer errors compared to systems relying on manually changing the IP address in each one of elements 14. While the foregoing example used one controller that changes an IP address, in some examples, elements 14 are configured to send data to a different controller (e.g., different processing circuitry and/or storage media, a different virtual machine, a different version of a controller, a different type or venders of controller, etc.).

Figure 2:
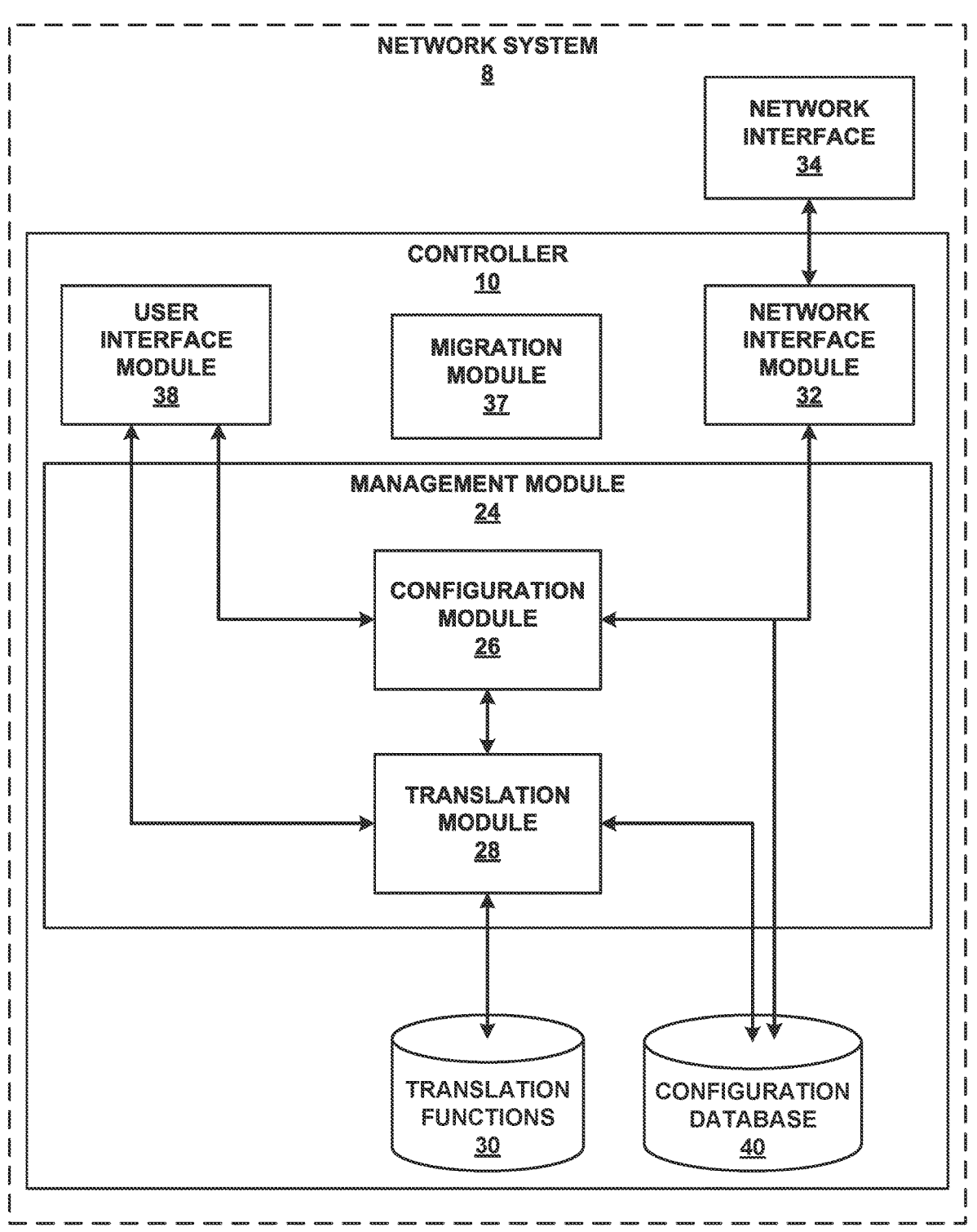
FIG. 2 is a block diagram illustrating an example network system that includes an example set of components of the controller of FIG. 1, in accordance with the techniques of the disclosure.

FIG. 2 is a block diagram illustrating an example network system 8 that includes an example set of components for controller 10 of FIG. 1. In this example, network system 8 includes network interface 34 and controller 10. Network interface 34 represents an example interface that can communicatively couple controller 10 to an external device, e.g., one or more of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller 10 may include multiple network interfaces in various examples, although only one network interface is illustrated for purposes of example.

Controller 10 represents any combination of hardware, software, and/or firmware for implementing the functionality attributed to controller 10. When controller 10 includes software or firmware, controller 10 may further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is implemented using fixed and/or programmable logic circuitry.

An administrator need not directly interact with controller 10, but instead may access controller 10 remotely, e.g., via network interface 34. Controller 10 includes user interface module 38, network interface module 32, and management module 24. Controller 10 executes user interface module 38 to receive input from and/or provide output to a user interface, which may be external to controller 10. Controller 10 also executes network interface module 32 to send and receive data (e.g., packets) via network interface 34. User interface module 38, network interface module 32, and management module 24 may again be implemented as respective hardware units, or in software or firmware, or a combination thereof.

Controller 10 executes management module 24 to manage various network devices, e.g., elements 14 of FIG. 1. Management includes, for example, configuring elements 14 according to instructions received from administrators 12 of FIG. 1 and providing administrators 12 with the ability to submit instructions to configure elements 14. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller 10 also includes configuration database 40. Configuration database 40 may include a data structure describing managed network devices, e.g., network elements 14. Configuration database 40 may be moved to a new computing environment, for example, in response to moving to a new tenant and/or virtual machine. This may relate to a change that results in controller 10 having a new IP address. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 may store current configuration information (e.g., intent data model, or in some cases, both intent data model and low-level configuration information) for the managed devices (e.g., network elements 14). Configuration database 40 may include a database that comprises a unified intent data model.

Management module 24 may maintain a data structure in configuration database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices. In some examples, network interface 34 may forward the high-level configuration instructions to the respective network devices (e.g., without translating the high-level configuration instructions to low-level configuration instructions). In some examples, network interface 34 forwards the high-level configuration instructions to the respective network devices. In this example, the operations performed by translation module 28 may be performed by an agent operating at the respective network devices.

Although a user interface is described for purposes of example of allowing administrators 12 to interact with controller 10, other interfaces may be used in other examples. For example, controller 10 may include a representational state transfer (REST) client (not shown) that may act as an interface to another device, by which administrator 12 may configure controller 10. Likewise, administrator 12 may configure elements 14 by interacting with controller 10 through the REST client.

Migration module 37 may output a change of IP address request to elements 14. If an agent (e.g., executing on element 14A) is not reachable due to, for example, a network issue, migration module 37 may use a predefined wait time, e.g., according to a predefined value stored in configuration database 40. In this example, migration module 37 may try again to send the request after the predefined wait time. Migration module 37 may refrain from sending a new controller IP address change request to an agent until a confirmation of the previous request is received from the agent. For example, migration module 37 may wait until a previous IP address change request is confirmed by an agent for element 14A before outputting a current IP address change request. If an agent does not receive a request to change the controllers IP address, the agent may continue to use the old IP to avoid a disruption of service.

Figure 3A:
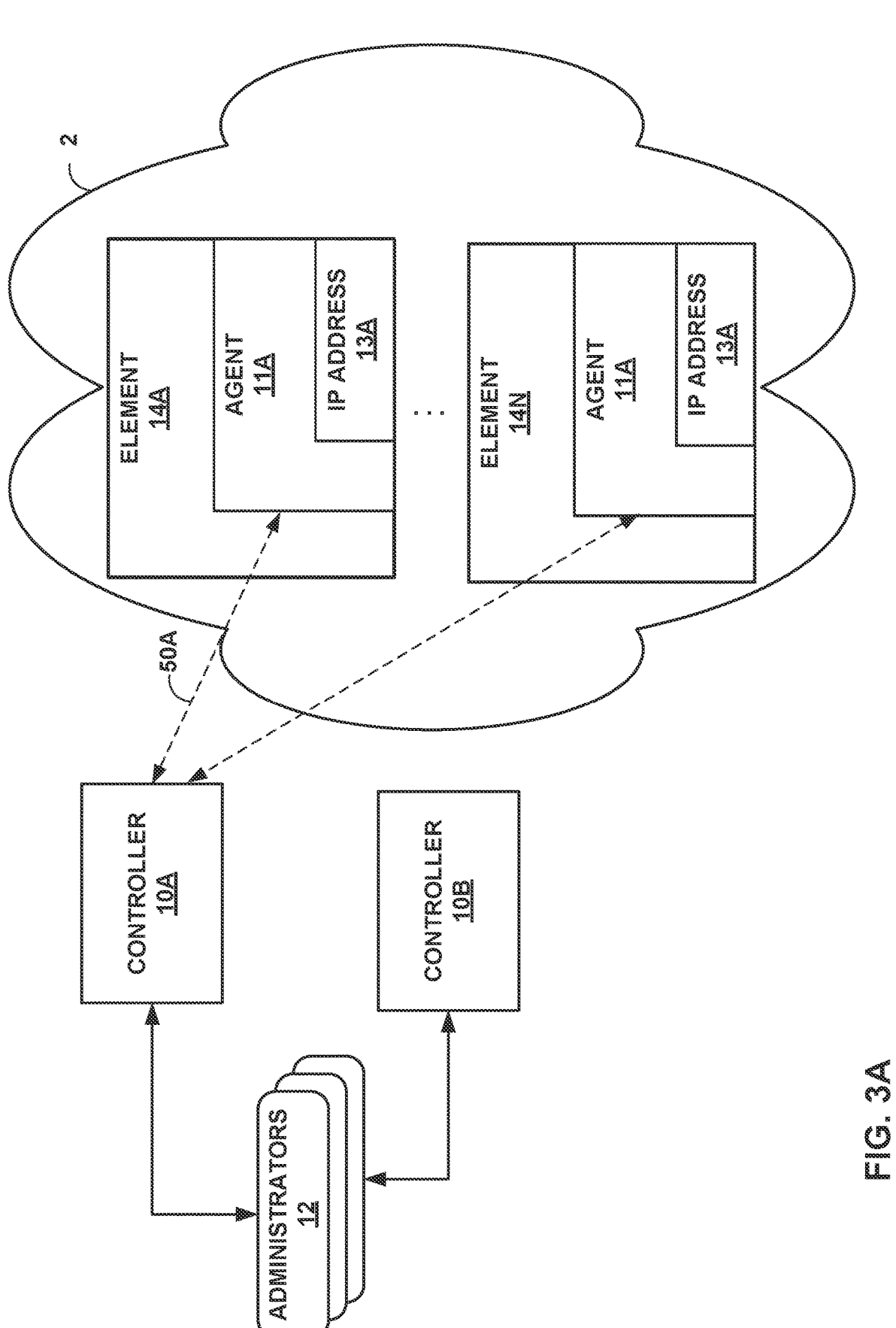
FIG. 3A is a block diagram illustrating an example of an agent configured for management by a first controller, in accordance with the techniques of the disclosure.

FIG. 3A is a block diagram illustrating an example of an agent 11A configured for management of element 14A on behalf of a first controller 10A, in accordance with the techniques of the disclosure. In this example, element 14A, or more specifically, agent 11A executing at element 14A, may exchange data 50A (e.g., receiving configuration data from the controller and/or sending telemetry data to the controller) with first controller 10A using a first IP address 13A. Agent 11A may be an agent of controller 10A, which executes on element 14A functions similar to or on behalf of the controller. For example, agent 11A may be a software element, such as a downloadable plugin, for interacting with or performing operations on behalf of controller 10A and/or 10B. In this example, agent 11A may operate element 14A based on the data exchanged with first controller 10A using first IP address 13A. Agent 11A may represent an on-box agent of element 14A. To operate element 14A using the first IP address 13A may include sending data to the controller 10A, such as periodically sending telemetry data collected by element 14A. Element 14A may receive one or more networking packets indicating first IP address 13A that include configuration information with. In this example, element 14A may operate element 14A based on the configuration information. Controller 10A may generate the configuration information based on the telemetry data. Examples of configuration data may include an operational policy regarding one or more of a security, a device accessibility, traffic engineering, a quality of service (QOS), a network address translation (NAT), packet filtering, packet forwarding, or rate limiting.

Figure 3B:
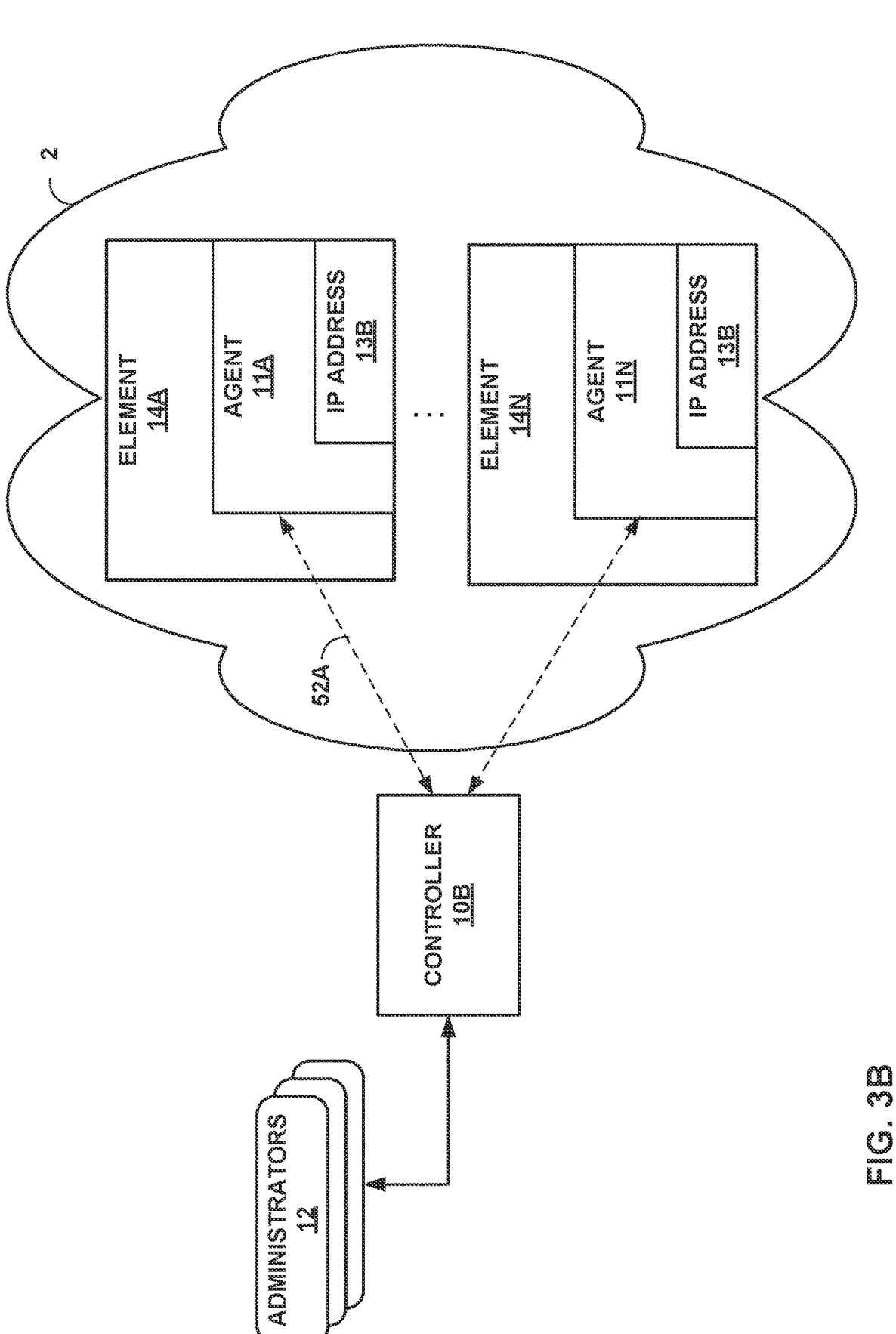
FIG. 3B is a block diagram illustrating an example of the agent of FIG. 3A configured for management by a second controller, in accordance with the techniques of the disclosure.

In the example of FIGS. 3A and 3B, controllers 10A, 10B may represent different controllers. For example, controllers 10A, 10B may use different processing circuitry and/or storage media. Controllers 10A, 10B may represent different virtual machines, different versions of a controller, and/or a different vender of controller, etc.). For example, controller 10A may represent a first virtual machine that manages elements 14 using only device-level configuration data provided by administrators 12. In this example, controller 10B may represent a second virtual machine that manages elements 14 using only device-level configuration data provided by administrators 12 and further using high-level configuration data provided by administrators 14 (e.g., a controller implementing Juniper Apstra®).

Although FIG. 3A illustrates controllers 10A, 10B as part of network 2, in some examples, controller 10A and/or controller 10B may be connected to network 2 using public network 18 (e.g., the Internet). For instance, controller 10A may represent a virtual machine and controller 10B may represent a cloud-based controller. In some instances, controller 10B may be arranged at a different rack, and located in a different subnet than a subnet of the data center associated with network 2 and/or a different, second data center than the first data center housing network 2. For example, a controller may be migrating from executing on a first virtual machine in a first data center to executing on a second virtual machine in a second data center. As part of this migration, the IP address associated with the controller may change from a first IP address to a second IP address. For example, this IP address change may occur because the second data center uses a different subnet than the first data center. In this example, a configuration database maintained by the controller may also be transferred from an initial location in the first data center to a new location in the second data center, to be associated with the second virtual machine.

FIG. 3B is a block diagram illustrating an example of an agent 11A configured for management by a second controller 10B, in accordance with the techniques of the disclosure. In response to an IP address change request indicating an instruction to change from first IP address 13A to a second IP address 13B, element 14A, or more specifically, agent 11A executing at element 14A may determine whether first controller 10A is accessible via first IP address 13A. Based on whether first controller 10A is accessible via first IP address 13A, element 14A, or more specifically, agent 11A executing at element 14A may change first IP address 13A to second IP address 13B. While determining whether first controller 10A is accessible via first IP address 13A agent 11A may continue to exchange data 50A with controller 10A via first IP address 13A. After changing to the second IP address 13B (e.g., after FIG. 3A), element 14A may exchange data 50B (e.g., configuration data and/or telemetry data) with second controller 10B using the second IP address 13B and operate based on the data exchanged with second controller 10B using second IP address 13B. For example, element 14A, using second IP address 13B, may receive, from the first controller 10A, configuration data and may operate based on the configuration data received from first controller 10A.

Figure 4:
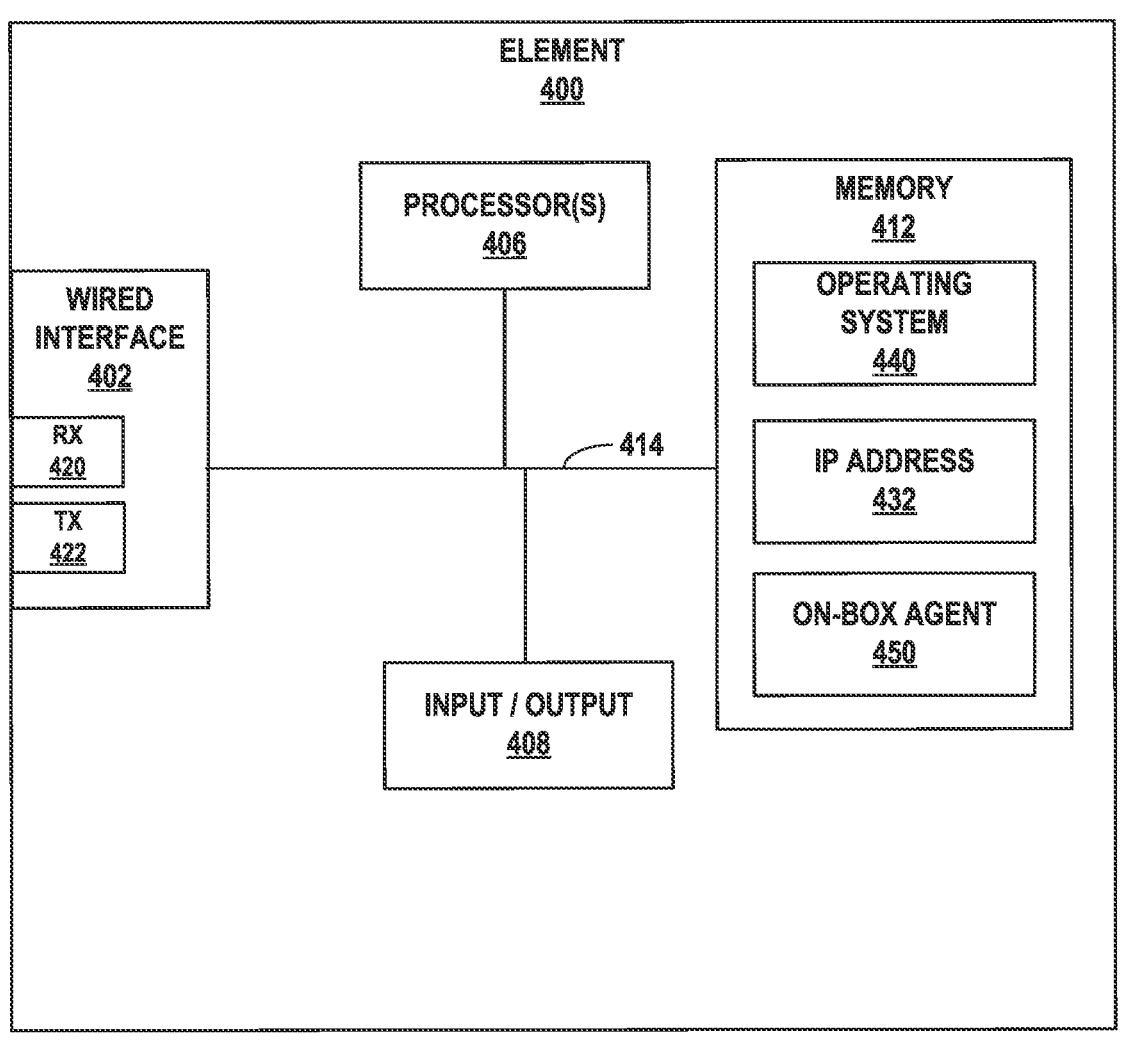
FIG. 4 is a block diagram illustrating an example element of FIG. 1, in accordance with the techniques described in this disclosure.

FIG. 4 is a block diagram illustrating an example element 400, in accordance with the techniques described in this disclosure. Element 400 of FIG. 4 may represent any of elements 14 of FIG. 1. In the example of FIG. 4, element 400 includes a communications interface 402, e.g., an Ethernet interface, a processor 406, input/output 408, e.g., display, buttons, keyboard, keypad, touch screen, mouse, etc., memory 412 coupled together via a bus 414 over which the various elements may interchange data and information. Communications interface 402 couples element 400 to a network, such as an enterprise network. Though only one interface is shown by way of example, those skilled in the art should recognize that network nodes may, and usually do, have multiple communication interfaces. Communications interface 402 includes a receiver (RX) 420 via which element 400, e.g., a server, can receive data and information. Communications interface 402 includes a transmitter (TX) 422, via which element 400, e.g., a server, can send data and information.

Memory 412, also referred to herein as computer-readable storage media, may store executable operating system 440, on-box agent 450, and an IP address 432 for exchanging data with controller 10. IP address 432 may represent a configuration file including an IP address for controller 10. For example, element 400, with on-box agent 450, may exchange data with controller 10 using IP address 432 and operate according to the data (e.g., configuration data, high-level instructions, or device-level instructions). Moreover, element 400, e.g., by on-box agent 450, may send telemetry information collected by element 400 to the controller using IP address 432 as a destination address. Examples of telemetry information may include, for example, interface statistics, traffic statistics (e.g., transmitted traffic and/or received traffic), or routing process statistics such as statistics about CPU utilization. Element 400 may exchange data with controller 10 using various protocols, for example, NetFlow, sFlow, Jflow, or gRPC Remote Procedure Calls (GRPC).

Figure 5:
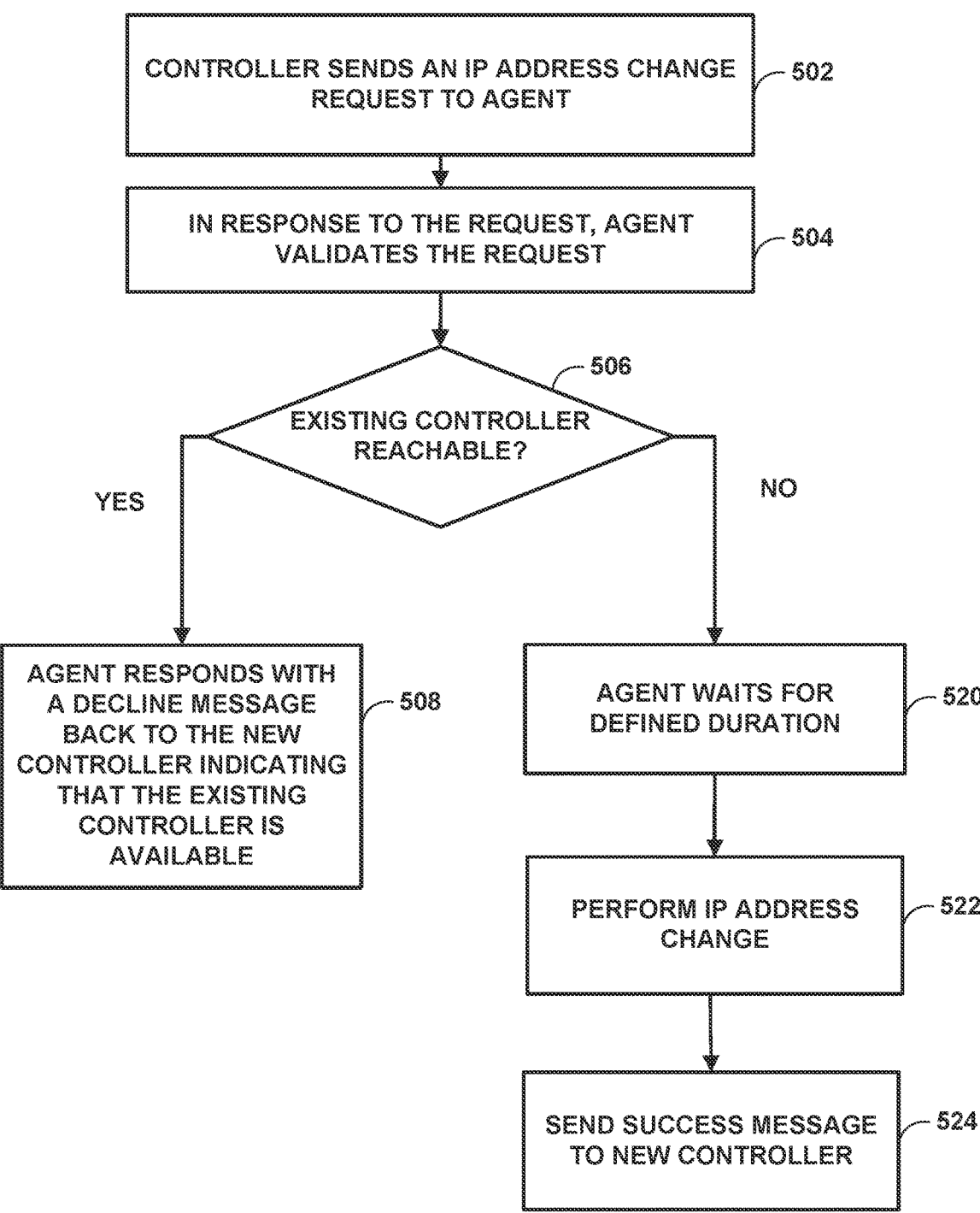
FIG. 5 is a flowchart illustrating a first example process for validating an Internet Protocol (IP) address change request, in accordance with the techniques described in this disclosure.

FIG. 5 is a flowchart illustrating a first example process for validating an IP address change request, in accordance with the techniques described in this disclosure. While performing migration of controller 10 from one tenant network to another, some systems rely on a change in management IP of controller 10. For example, administrators 12 may migrate controller 10 from executing on a first virtual machine (e.g., on a first physical device) to executing on a second virtual machine (e.g., on a second physical device). In case of systems with an on box agent, such systems may rely on additional steps of updating a controller IP address in each of the agent of elements 14. Some systems rely on a manual step that involves a login by administrators 12 into each element where an on-box agent is running and modification of one or more configuration files to point to the new controller IP address. In an environment with large number of nodes, this may be undesirable. Some systems may define a fully qualified domain name (FQDN) instead of IP address. However, such systems may use a domain name server, which may not be set up for use by elements 14.

When migrating controller 10 from one tenant network to another, system 100 (or more specifically, for example, controller 10 or element 400 of FIG. 4) may implement the following process to automatically update the management IP address of controller 10 on the agents of elements 14. Controller 10 (e.g., being executed by a first virtual machine) sends an IP address change request to agents of the controller, where the agents operate, for example, at elements 14 (502). For example, a newly migrated VM sends a controller IP address change request to one or more onboarded on-box agents implemented by elements 14. This can be triggered either by the administrator 12 or automatically by controller 10 upon determining the need to change the IP address associated with controller 10.

In response to receiving the IP address change request, an agent validates the request (504). For example, upon receiving the request, the agent executing at element 14 may validate whether the request is from trusted source. The agent executing at element 14 may determine whether the existing controller is reachable (506). If the existing controller is not reachable ("no" of step 506), the agent may wait for a defined duration (520). If the existing controller is still not reachable after that duration, the agent considers the controller to be dead (e.g., offline). In this example, the agent performs the IP address change in all required files (522). The agent may respond with a success message to the new controller (524). However, if the existing controller is reachable ("yes" of step 506), the agent may respond with a decline message back to the new controller, saying the existing controller is still up (508).

Techniques described herein for responding to an IP change request can be applied to any system involving any server-client relationship where a server changes from using a first IP address to using a second IP address for sending and receiving communications by the server. The techniques can be applied to Juniper Apstra™ platform, Juniper Paragon™ platform, and/or any other monitoring and/or configuration management platforms. For example, administrators 12 and/ or controller 10 may trigger the request from controller 10 to perform a controller IP address change towards clients/ agents. In this example, the agents may determine whether the request to change the IP address is valid and/or secure. If the agent determines the request is valid and secure, the agent may update the IP address and respond back to controller 10.

Figure 6:
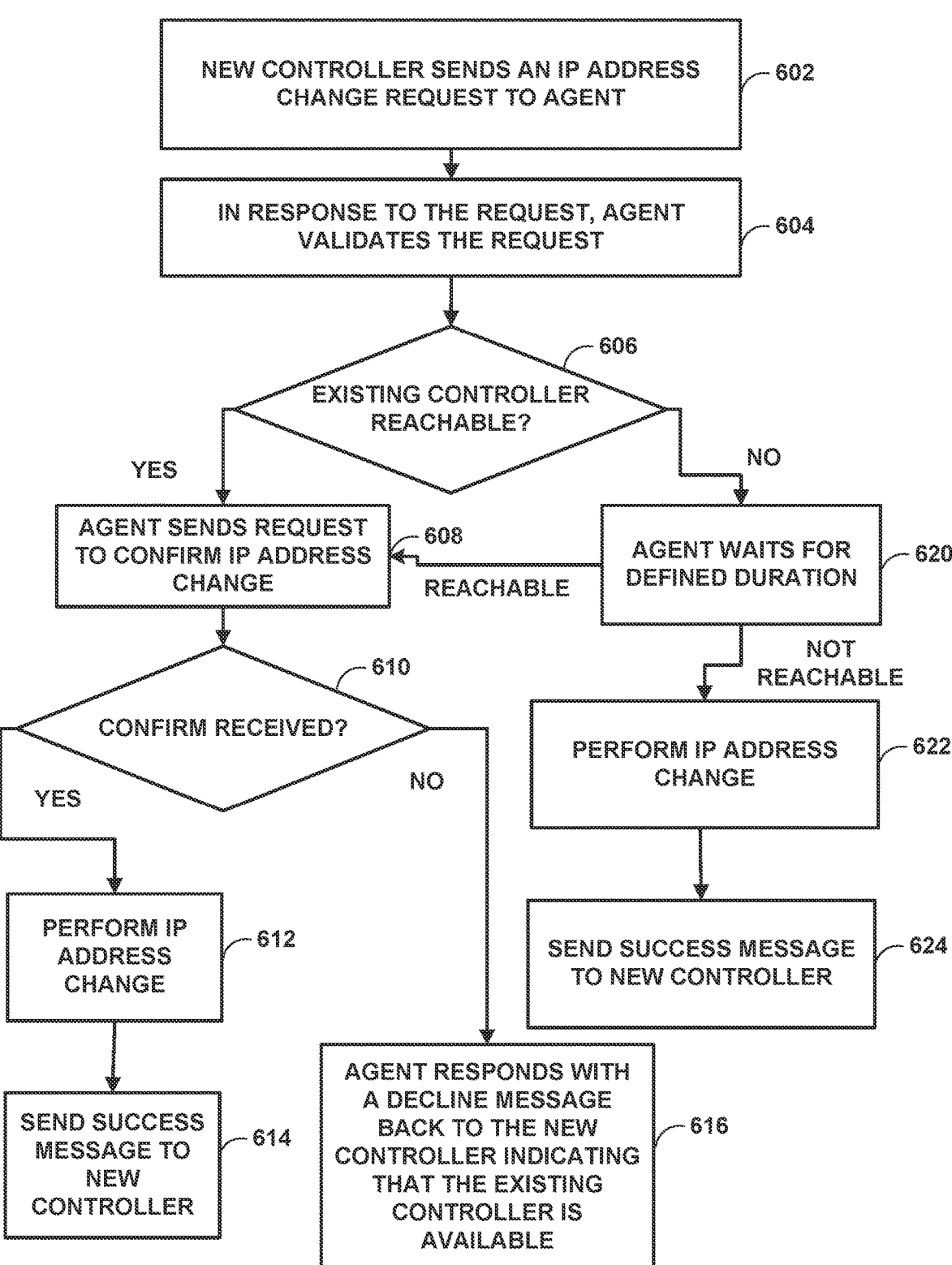
FIG. 6 is a flowchart illustrating a second example process for validating an IP address change request, in accordance with the techniques described in this disclosure.

FIG. 6 is a flowchart illustrating a second example process for validating an IP address change request, in accordance with the techniques described in this disclosure. FIG. 6 illustrates an example of an IP address migration procedure where the existing controller is operating and in a migration mode.

Similar to FIG. 5, a new controller 10 (e.g., a new controller instance executing on a new virtual machine) may send an IP address change request to agents, for example, operating at elements 14 (602). In response to the IP address change request, each agent validates the request (604) and may determine whether the existing controller instance is reachable at the old virtual machine (606). If the existing controller is not reachable, the agent may wait for a defined duration (620). If the existing controller is reachable during the duration, the agent may send a controller IP change confirmation request to the existing controller (608). If the existing controller is still not reachable after that duration ("not reachable" of step 606), the agent considers the controller to be dead. In this example, the agent performs the IP address change in all required files (622). The agent may respond with a success message to the new controller (624).

However, if the existing controller is reachable ("yes" of step 606 or "reachable" within duration of 620), the agent may send a controller IP change confirmation request to the existing controller (608). The existing controller may have a flag set to respond as 'confirm' or 'not confirm'. For instance, administrator 12 may set the flag to confirm and the existing controller may output a confirmation responsive to a request to confirm the IP address change request. If 'confirm' is received by an agent ("yes" of step 610), the agent performs the IP address change in all required files (612), and the agent may respond to the new controller with a successful message (614). If 'not confirm' is received by the agent ("no" of step 610), the agent responds with a decline message back to the new controller saying the existing controller is still up (616). Once all agents have confirmed the IP change, the existing controller can safely be decommissioned, such as by stopping the virtual machine on which the existing controller was executed, and/or removing a server on which the existing controller was running.

FIG. 7 is a flowchart illustrating an example process for processing an IP address change request, in accordance with the techniques described in this disclosure. FIG. 7 is discussed with reference to FIGS. 1-6 for example purposes only.

Element 14A may send data to controller 10 using a first IP address stored by computer-readable storage media as an IP address associated with controller 10 (702). For example, element 14A may send telemetry data for the network device to first controller 10A using first IP address 13A as a destination address. In some examples, element 14A may receive, by a communication from first controller 10A having the first IP address 13A as a source address, configuration data for element 14A.

Element 14A may receive a request to change the IP address associated with controller 10 from first IP address 13A to second IP address 13B (704). In response to receiving a request to change the IP address associated with the controller from first IP address 13A to second IP address 13B, element 14A may determine whether controller 10 is accessible using the first IP address 13A (706). In some examples, the first IP address 13A and the second IP address 13B access one controller. For instance, second controller 10B is first controller 10A configured with the second IP address 13B. In some examples, first controller 10A and second controller 10B represent different devices (e.g., physical devices and/or virtual devices). For example, second controller 10B and first controller 10A may include different processing circuitry and/or different computer-readable storage media.

Based on whether controller 10 is accessible via first IP address 13A, element 14A may change first IP address 13A associated with controller 10 and stored by computer-readable storage media (e.g., memory 412) to second IP address 13B (708). For example, element 14A may output a request for a reply to first controller 10A device using first IP address 13A and, after an amount of time since the output of the request exceeds a threshold time, determine that first controller 10A is not accessible via first IP address 13A when no reply has been received from first controller 10A. Element 14A may change first IP address 13A stored at the computer-readable storage media to second IP address 13B when first controller 10A is not accessible via first IP address 13A. In response to the change first IP address 13A stored at the computer-readable storage media to second IP address 13B, element 14A output a success message to second controller 10B via second IP address 13B.

In contrast, in response to a second IP address change request indicating an instruction to change from the first IP address to a third IP address, element 14A may determine whether first controller 10A is accessible via first IP address 13A. Based on a determination that first controller 10A is accessible via first IP address 13A, element 14A may refrain from changing first IP address 13A stored at the computer-readable storage media to the third IP address. Element 14A may output a decline message to the third controller via the third IP address.

In response to a determination that first controller 10A is accessible via first IP address 13A, element 14A may output a request to confirm the IP address change request to first controller 10A using the first IP address 13A. In this example, element 14A may receive, from first controller 10A, a confirmation responsive to the request to confirm the IP address change request. Element 14A may change first IP address 13A stored at the computer-readable storage media to second IP address 13B in response to the confirmation. In response to the change first IP address 13A stored at the computer-readable storage media to second IP address 13B, element 14A output a success message to second controller 10B via second IP address 13B.

In contrast, in response to a determination that first controller 10A is accessible via first IP address 13A, element 14A may output a request to confirm the IP address change request to the first controller using the first IP address. In this example, element 14A may receive, from first controller 10A, a decline message responsive to the request to confirm the IP address change request, the decline message indicating that the first controller declines the second IP address change request. In response to receiving the decline message, element 14A may refrain from changing first IP address 13A stored at the computer-readable storage media to the third IP address. Element 14A may output a decline message to the third controller via the third IP address.

Element 14A may send data to controller 10 using the second IP address stored by computer-readable storage media as an IP address associated with controller 10 (710). For example, element 14A may send telemetry data for the network device to first controller 10A using first IP address 13A as a destination address. In some examples, element 14A may receive, by a communication from first controller 10A having the first IP address 13A as a source address, configuration data for element 14A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components that collectively, if not individually, are operable to implement the described techniques. The term "processor" or "processing circuitry" may refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in computer-readable media containing instructions. The computer-readable media may include multiple distributed and physically separate computer-readable media collectively containing instructions. Instructions embedded or encoded in computer-readable media may cause one or more programmable processors, or other processor(s), to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

16

What is claimed is:

1. A system comprising computer-readable storage media and one or more processors operable to:

send data to a controller using a first Internet Protocol (IP) address as a destination address for the controller, the first IP address stored by the computer-readable storage media as an IP address associated with the controller;

based on receiving a request to change the IP address associated with the controller from the first IP address to a second IP address, output a request for reply to the controller using first IP address as the destination address for the controller;

based on a determination that no reply has been received from the controller after a threshold time since the output of the request for reply, change the IP address associated with the controller and stored by the computer-readable storage media to the second IP address; and send, based on the change to the IP address associated with the controller, data to the controller using the second IP address as the destination address for the controller.

2. The system of claim 1, wherein the one or more processors are operable to:

based on a determination that a reply has been received from the controller within the threshold time since the output of the request for reply, output a request to confirm the request to change the IP address to the controller using the first IP address as the destination address for the controller;

receive, from the controller, a confirmation responsive to the request to confirm the IP address change request; and change the first IP address stored at the computer-readable storage media to the second IP address in response to the confirmation.

3. The system of claim 1, wherein the one or more processors are operable to, in response to the change of the first IP address stored at the computer-readable storage media to the second IP address, output a success message to the controller using the second IP address as the destination address for the controller.

4. The system of claim 1, wherein the request to change the IP address is a first IP address change request and wherein the one or more processors are operable to:

in response to a second request to change the IP address indicating an instruction to change from the first IP address to a third IP address, determine whether the controller is accessible using the first IP address as the destination address for the controller; and based on a determination that the controller is accessible using the first IP address as the destination address for the controller, refrain from changing the first IP address stored at the computer-readable storage media to the third IP address.

5. The system of claim 4, wherein the one or more processors are operable to output a decline message to the controller via the third IP address.

6. The system of claim 1, wherein the request to change the IP address is a first request to change the IP address and wherein the one or more processors are operable to, in response to a second request to change the IP address indicating an instruction to change from the first IP address to a third IP address:

in response to a determination that the controller is accessible using the first IP address as the destination address for the controller, output a request to confirm the IP address change request to the controller using the first IP address as the destination address for the controller;

receive, from the controller, a decline message responsive to the request to confirm the IP address change request, the decline message indicating that the controller declines the second IP address change request; and in response to receiving the decline message, the one or more processors are configured to refrain from changing the first IP address stored at the computer-readable storage media to the third IP address.

7. The system of claim 6, wherein the one or more processors are operable to output a decline message to the controller via the third IP address.

8. The system of claim 1, wherein, to send data to the controller using the first IP address as the destination address for the controller, the one or more processors are operable to output telemetry data for a network device to the controller using the first IP address.

9. The system of claim 1, wherein the one or more processors are further operable to:

receive, from the controller, configuration data for a network device; and operate the network device based on the configuration data received from the controller.

10. The system of claim 9, wherein the configuration data indicates an operational policy regarding one or more of a security, a device accessibility, traffic engineering, a quality of service (QOS), a network address translation (NAT), packet filtering, packet forwarding, or rate limiting.

11. A method comprising:

sending, by one or more processors, data to a controller using a first Internet Protocol (IP) address as a destination address for the controller, the first IP address stored by computer-readable storage media as an IP address associated with the controller;

based on receiving a request to change the IP address associated with the controller from the first IP address to a second IP address, outputting, by the one or more processors, a request for reply to the controller using first IP address as the destination address for the controller;

based on determining that no reply has been received from the controller after a threshold time since the output of the request for reply, changing, by the one or more processors, the IP address associated with the controller and stored by the computer-readable storage media to the second IP address; and sending, by the one or more processors and based on the change to the IP address associated with the controller, data to the controller using the second IP address as the destination address for the controller.

12. The method of claim 11, further comprising:

based on determining that that a reply has been received from the controller, outputting, by the one or more processors, a request to confirm the request to change the IP address to the controller using the first IP address as the destination address for the controller;

receiving, by the one or more processors and from the controller, a confirmation responsive to the request to confirm the IP address change request; and changing, by the one or more processors, the first IP address stored at the computer-readable storage media to the second IP address in response to the confirmation.

13. The method of claim 11, further comprising, in response to the changing of the first IP address stored at the computer-readable storage media to the second IP address, outputting, by the one or more processors, a success message to the controller using the second IP address as the destination address for the controller.

14. The method of claim 11, wherein the request to change the IP address is a first IP address change request, the method further comprising:

in response to a second request to change the IP address indicating an instruction to change from the first IP address to a third IP address, determining, by the one or more processors, whether the controller is accessible using the first IP address as the destination address for the controller; and based on determining that the controller is accessible using the first IP address as the destination address for the controller, refraining from changing the first IP address stored at the computer-readable storage media to the third IP address.

15. The method of claim 14, further comprising outputting, by the one or more processors, a decline message to the controller via the third IP address.

16. Non-transitory computer-readable storage media comprising instructions, that when executed, cause one or more programmable processors to:

send data to a controller using a first Internet Protocol (IP) address as a destination address for the controller, the first IP address stored by the computer-readable storage media as an IP address associated with the controller;

based on receiving a request to change the IP address associated with the controller from the first IP address to a second IP address, output a request for a reply to the controller using first IP address as the destination address for the controller;

based on a determination that no reply has been received from the controller after a threshold time since the output of the request, change the IP address associated with the controller and stored by the computer-readable storage media to the second IP address; and send, based on the change to the IP address associated with the controller, data to the controller using the second IP address as the destination address for the controller.

17. The non-transitory computer-readable storage media of claim 16, wherein the instructions further cause the one or more programable processors to:

based on a determination that a reply has been received from the controller within the threshold time since the output of the request for reply, output a request to confirm the request to change the IP address to the controller using the first IP address as the destination address for the controller;

receive, from the controller, a confirmation responsive to the request to confirm the IP address change request; and change the first IP address stored at the computer-readable storage media to the second IP address in response to the confirmation.

18. The non-transitory computer-readable storage media of claim 16, wherein the request to change the IP address is a first IP address change request and wherein the instructions further cause the one or more programable processors to:

in response to a second request to change the IP address indicating an instruction to change from the first IP address to a third IP address, determine whether the controller is accessible using the first IP address as the destination address for the controller; and based on a determination that the controller is accessible using the first IP address as the destination address for the controller, refrain from changing the first IP address stored at the computer-readable storage media to the third IP address.

19. The non-transitory computer-readable storage media of claim 16, wherein the request to change the IP address is a first request to change the IP address and wherein the instructions further cause the one or more programable processors to, in response to a second request to change the IP address indicating an instruction to change from the first IP address to a third IP address:

in response to a determination that the controller is accessible using the first IP address as the destination address for the controller, output a request to confirm the IP address change request to the controller using the first IP address as the destination address for the controller;

receive, from the controller, a decline message responsive to the request to confirm the IP address change request, the decline message indicating that the controller declines the second IP address change request; and in response to receiving the decline message, the one or more processors are configured to refrain from changing the first IP address stored at the computer-readable storage media to the third IP address.

20. The non-transitory computer-readable storage media of claim 16, wherein the instructions further cause the one or more programable processors to:

receive, from the controller, configuration data for a network device; and operate the network device based on the configuration data received from the controller.

\* \* \* \* \*